United States Patent [19]

Yoshizawa et al.

[11] Patent Number: 5,732,299
[45] Date of Patent: Mar. 24, 1998

[54] FILM TRANSPORT DEVICE FOR A CAMERA

[75] Inventors: Akihiro Yoshizawa; Toshiyuki Nakamura, both of Tokyo, Japan

[73] Assignee: Nikon Corporation, Tokyo, Japan

[21] Appl. No.: 705,806

[22] Filed: Aug. 30, 1996

[30] Foreign Application Priority Data

Sep. 7, 1995 [JP] Japan .................................. 7-230082

[51] Int. Cl.$^6$ ...................................................... G03B 1/00
[52] U.S. Cl. .......................... 396/409; 396/406; 396/397
[58] Field of Search ................................ 396/395, 397, 396/406, 409

[56] References Cited

U.S. PATENT DOCUMENTS

| | | | |
|---|---|---|---|
| 4,440,481 | 4/1984 | Hoda et al. | 354/171 |
| 5,452,055 | 9/1995 | Smart | 355/68 |
| 5,481,331 | 1/1996 | Cocca et al. | 354/412 |
| 5,625,850 | 4/1997 | Nishinou | 396/269 |

*Primary Examiner*—David M. Gray
*Assistant Examiner*—Eric Nelson
*Attorney, Agent, or Firm*—Oliff & Berridge, p.l.c.

[57] ABSTRACT

A camera is provided having a film transport device that performs accurate detection of an end of film, even if there is a change in the electric power voltage or film transport mechanism load, e.g., because of a temperature change in the camera. The film transport device includes a film advance device that winds the film onto the spool of a camera, a motor, and first and second edge detectors that detect perforations in the film by detecting edges of the perforations. The film perforations are arranged before and after the film frame in a direction of the film advancement. A film transport controller stops the winding of the film by the film advance device when the film transport controller determines that the film has been wound to its end. The film transport controller determines that the film end has been reached when a perforation is detected by the first edge detection device prior to the detection of a specified number of perforations by the second edge detection device.

30 Claims, 12 Drawing Sheets

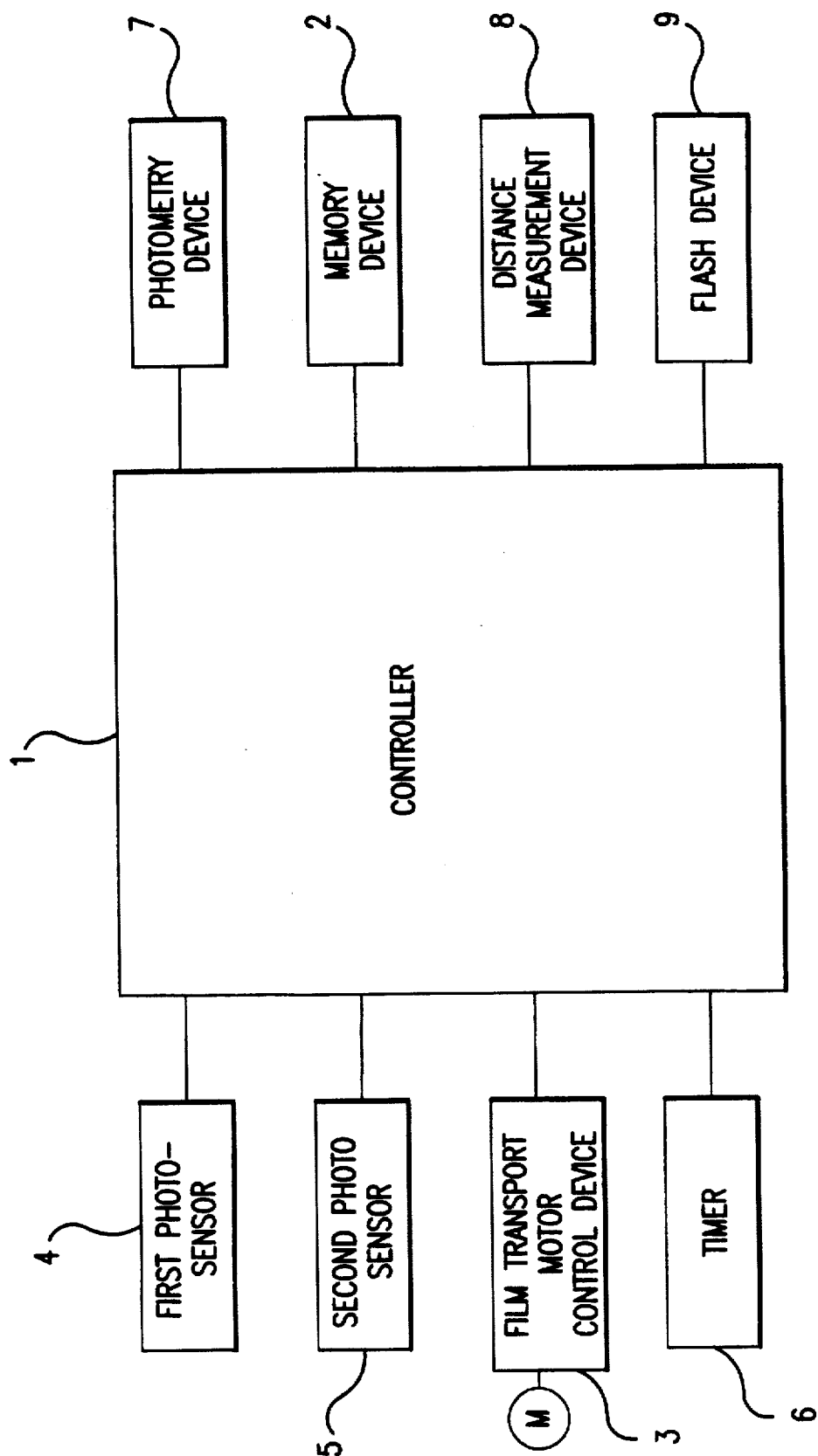

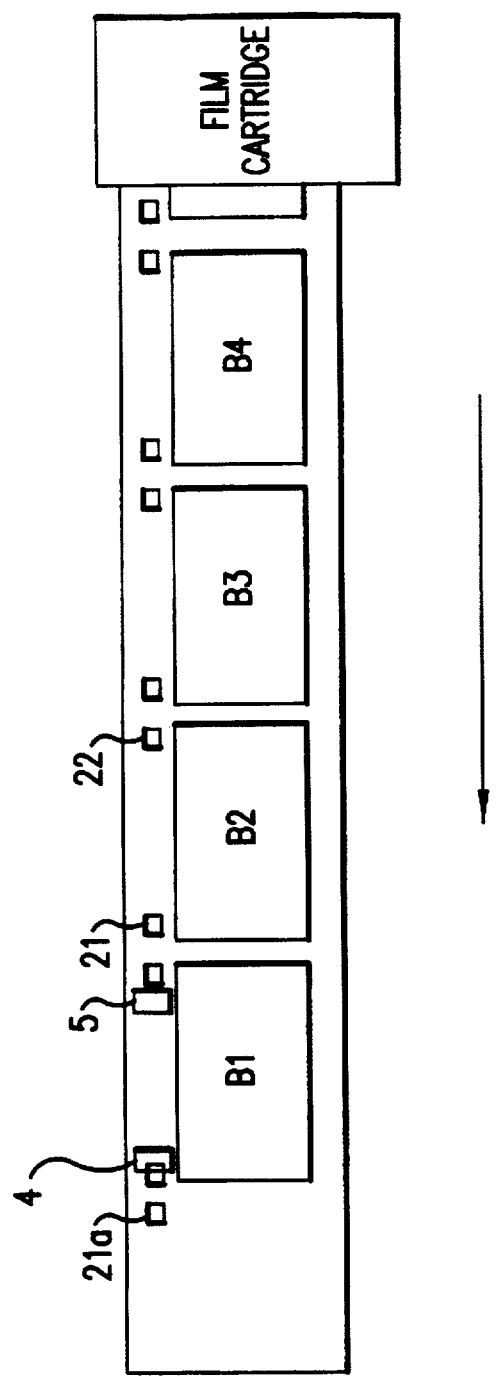
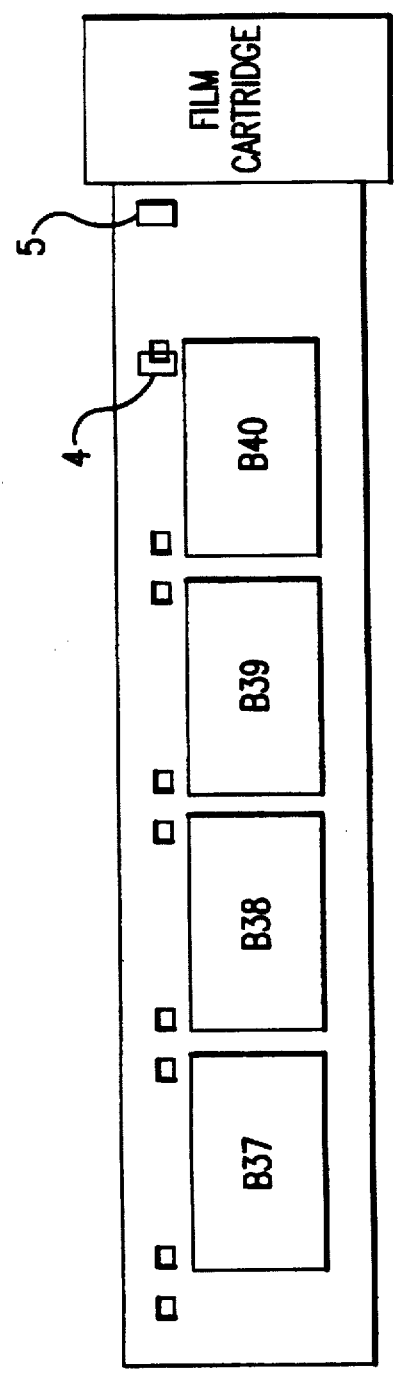
FIG.2(a)
FIG.2(b)

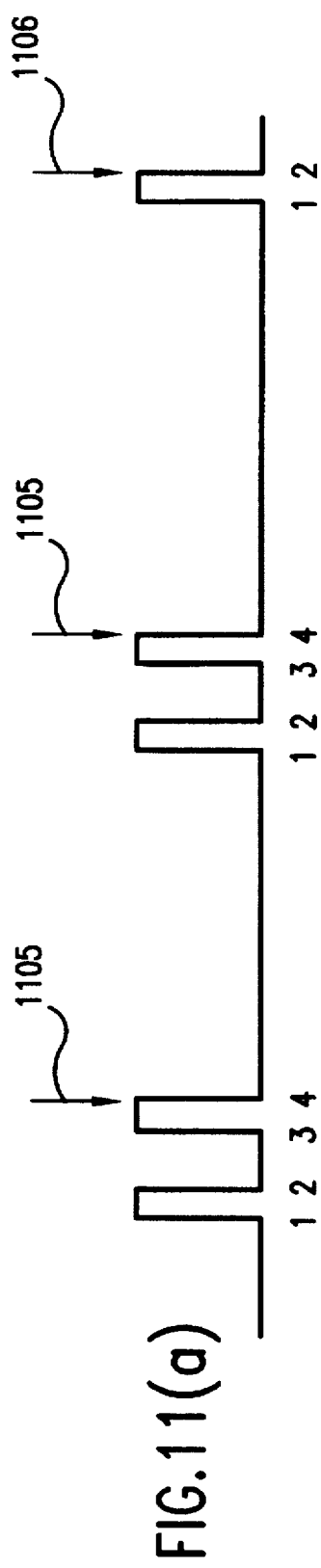
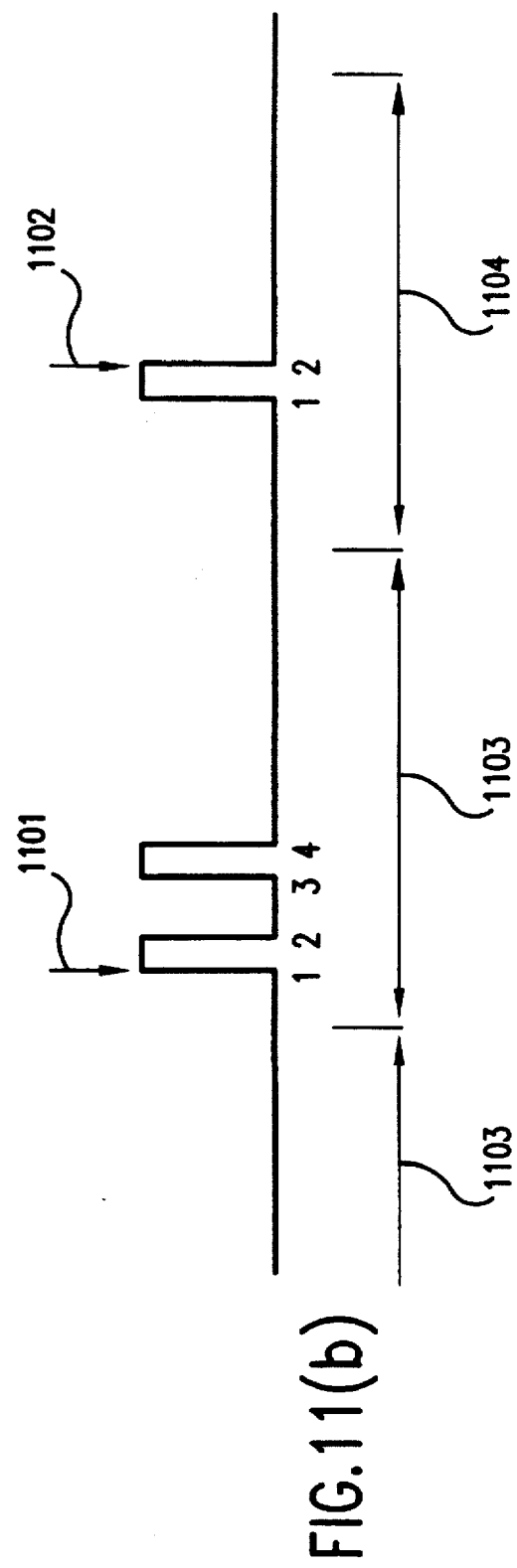
FIG.11(a)
FIG.11(b)

FILM TRANSPORT DEVICE FOR A CAMERA

BACKGROUND OF THE INVENTION

1. Field of the Invention

The present invention relates to a camera film transport device and method that uses film perforation detection to monitor and control the feeding of film in the camera.

2. Description of Related Art

A conventional film transport device for a camera transports film and detects film perforations using a photosensor. Operations of the conventional camera film transport device are described below.

Film in a film cartridge is loaded into a film cartridge chamber of a camera. When a film cartridge chamber lid is closed, the presence of the film cartridge is confirmed and the film is transported to a specified photographic position of a first frame of the film using a film advance mechanism. One or more photosensors (e.g., photo-reflectors, photo-interrupters or the like) are arranged in a film transport path. The film perforations are detected using the photosensors. Film transport control stops the film first frame at the specified photographic position. Ordinarily, the photosensors are arranged so that the film transport is stopped by the film transport control when the film perforations are detected. Thus, a photographic screen for each film frame faces the specified photographic position.

When photography of one photograph is completed, then the film is transported one film frame distance to the next film frame. Thus, the film is advanced to the specified photographic position for the next photographic frame. This is referred to as one frame advance or one film frame transport to establish the next frame in the camera's specified photographic position. Following each photograph, the one frame advance transports the film until a specified number of film perforations are detected by the photosensor. Further, during each one frame advance, time is measured until the specified number of the film perforations are detected. If the specified number of film perforations are not detected within a specified period of time, a determination is made that the film has advanced to its end and the film advance mechanism is stopped. The film rewinding begins using a rewind mechanism. The film is rewound until the film is completely housed in the film cartridge.

The film transport mechanism can be driven by a motor. Because a voltage supplied to the motor can change as the batteries discharge or because an electric power source voltage changes with temperature, the film transport speed changes. Further, because the load of the film transport mechanism changes with temperature, the film transport speed also changes. When the electric power source voltage or the temperature becomes high, then the film transport speed becomes relatively faster. When the electric power source voltage or the temperature becomes low, the film transport speed becomes relatively slower.

A conventional camera film transport device performing one film frame advance when the electric power voltage or the temperature is low has a slower film transport speed. Thus, detection of the film perforations cannot be accomplished within the specified time, which causes the erroneous determination that the film has reached its end. Conversely, if the electric power source voltage or temperature is high, the conventional camera film transport speed is faster. Thus, the voltage is unnecessarily supplied to the motor for a long period of time after the film is advanced to its end.

SUMMARY OF THE INVENTION

It is an object of the present invention to solve at least the above-described problems of conventional camera film transport devices.

It is another object of the present invention to provide a camera film transport device that accurately detects the end of the film even if the electric power source voltage or the film transport mechanism load changes because of a temperature changes.

In order to achieve the above and other objects and to address shortcomings in the prior art, a camera film transport device and method according to embodiments of the invention include first and second edge detectors arranged before and after a film photographic position in the direction of film advancement, respectively, to detect the edges of film perforations in the film (thereby detecting the film perforations), and a film transport controller that determines that the film has advanced to a film end when the first edge detector detects a perforation before a specified number of film perforations are detected by the second edge detector. The film transport controller stops a film advance device from advancing the film when the film end is determined.

The film transport controller can determine that the film end is reached based on the first and second edge detectors detecting leading or trailing edges of the film perforations or by detecting both leading and trailing edges.

Other objects, advantages and salient features of the invention will become apparent from the detailed description taken in conjunction with the annexed drawings, which illustrate preferred embodiments of the invention.

BRIEF DESCRIPTION OF THE DRAWINGS

The invention will be described with reference to the following drawings in which like reference numerals refer to like elements and wherein:

FIG. 1 is a block diagram of a camera structure including a film transport device according to embodiments of the present invention;

FIGS. 2(a)–2(b) are diagrams illustrating a positional relationship between a first photosensor, a second photosensor and film according to embodiments of the present invention;

FIGS. 11(a)–11(b) are diagrams showing an output wave shape of a first photosensor and of a second photosensor at the time of film advance.

DETAILED DESCRIPTION OF PREFERRED EMBODIMENTS

Figure 3:
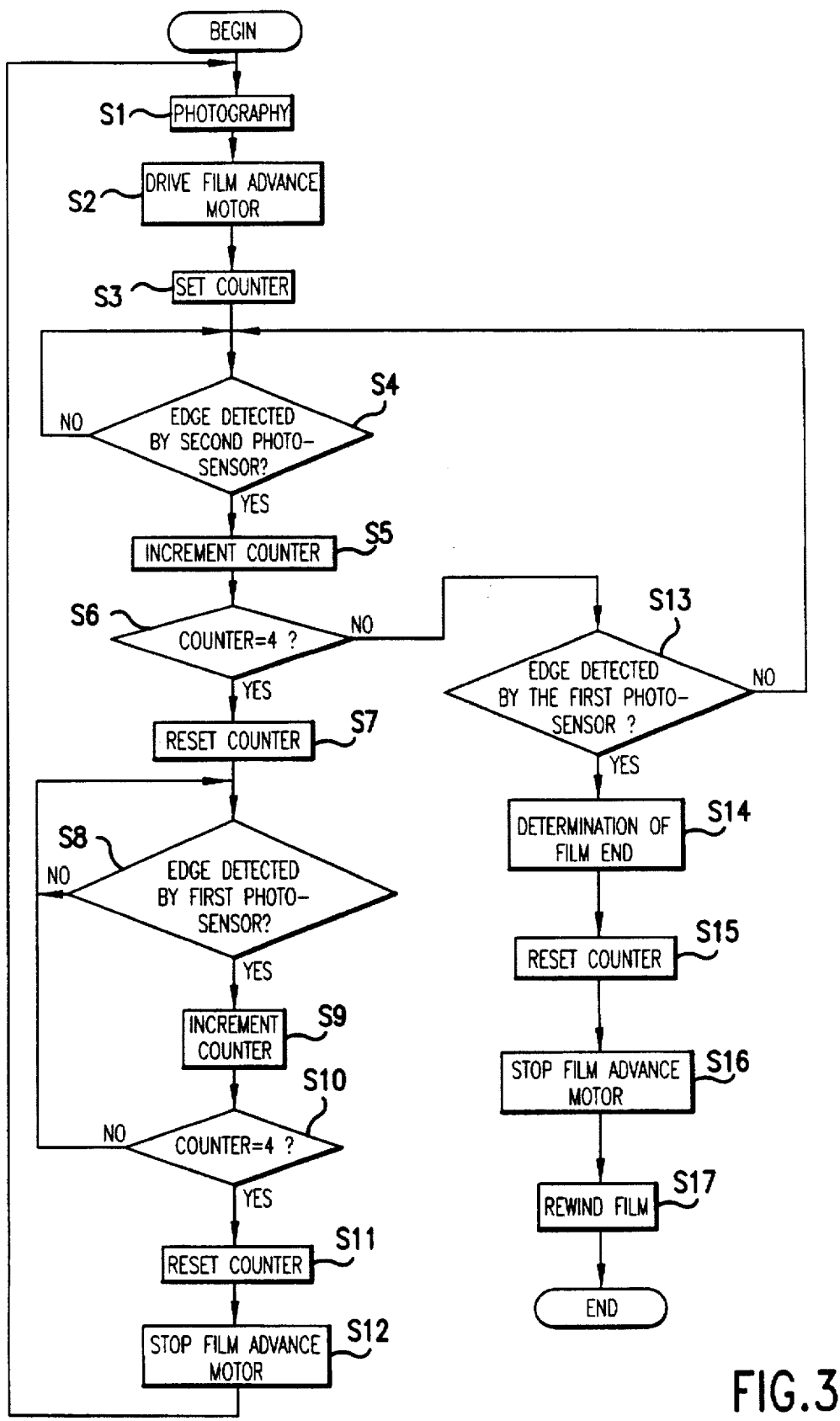
FIG. 3 is a flow chart showing a film transport sequence according to an embodiment of the present invention.

A controller 1 is shown in FIG. 1. The controller 1 is a one chip type microcomputer including at least an A/D conversion function, a D/A conversion function, and a calculation and comparison function to perform control and calculation of camera operations relative to a photometry device 7, a distance measurement device 8, a flash device 9, and a focus adjustment device and the like. In the illustrated embodiment of FIG. 1, the camera controller is implemented using a suitably programmed microcomputer, for overall, system-level control. Alternatively, a general purpose computer, e.g., microprocessor or other processor device (CPU or MPU), either alone or in conjunction with one or more peripheral (e.g., integrated circuit) data and signal processing devices could be used. It will be appreciated by those skilled in the art that the controller can also be implemented using a single special purpose integrated circuit (e.g., ASIC) having a central processor section for overall system-level control, and separate sections dedicated to performing various different specific computations, functions and other processes under control of the central processor section or a plurality of separate dedicated or programmable integrated or other electronic circuits or devices (e.g., hardwired discrete element circuits, or programmable logic devices such as PLDs, PLAs, PALs or the like). In general, any device or assembly of devices on which a finite state machine capable of implementing the flowcharts shown in FIGS. 3–10 can be used as the controller. A distributed processing architecture is preferred for maximum data/signal processing capability and speed.

The controller 1 is connected to a memory device or recording apparatus 2, a film transport motor control device 3, a first photosensor 4, a second photosensor 5, a timer 6, a photometry device 7, a distance measurement device 8, a flash device 9 and the like as shown in FIG. 1. Stored in the memory device 2 are threshold values and control data for detecting edges of film perforations in film. The film transport motor control device 3 is connected to a film transport motor M. The first photosensor 4 and the second photosensor 5 can be transparent type photo-interrupters, phototransistors or the like. The photosensors 4, 5 output analog voltage signals corresponding to the amount of incident light detected. The photosensors 4, 5 are connected to the A/D conversion port of the controller 1. The controller 1 converts the received analog voltage signal to a digital voltage signal. The photosensors 4, 5 can use a photo-interrupter or a photo-reflector technique as are known to those of ordinary skill in the art.

An exemplary positional relationship between the first photosensor 4, the second photosensor 5 and the film will now be described. As shown in FIGS. 2(a)–2(b), B1–B40 are respective photographic screens of each of the frames of film. The film used in a first embodiment according to the present invention has two perforations for each photographic frame of film. A leading perforation 21 is formed in a leading portion of the photographic screen and a trailing perforation 22 is formed in a trailing portion of the photographic screen of each photographic frame of film. Additionally, as shown in FIG. 2(a), a film perforation 21a is provided on a leader side of the first frame B1. The first photosensor 4 is positioned after the position of the passage of the leading film perforations on the wind up spool side of the camera. The second photosensor 5 is positioned before the position of the passage of the trailing film perforations of each film frame in the photographic position on the film cartridge side.

The film is wound from the direction of right to left as illustrated by the horizontal arrow shown in FIGS. 2(a) and 2(b). Thus, in advancing the film to the photographic position of the first frame B1, a perforation detection signal is output from the second photosensor 5 and then a perforation detection signal is output from the first photosensor 4. With the advance of one single film frame following photography, the second photosensor 5 detects two film perforations, followed by the first photosensor 4 detecting two film perforations.

When the photography of a final frame, B40 is completed and one film frame is advanced, then the second photosensor 5 detects one perforation and the first photosensor 4 then detects one perforation. The single film perforation detections by the first photosensor 4 and the second photosensor 5 are used to determine that the film is advanced to its end. Thus, the film winding is terminated.

The output of the first photosensor 4 and the output of the second photosensor 5 during film advancement are shown in FIGS. 11(a) and 11(b), respectively.

With the first embodiment, the photosensors 4 and 5 are transparent type photosensors. Therefore, when a perforation reaches the photosensor position, there is a corresponding increase in the output of the photosensors 4, 5. After the perforation passes the photosensor position, there is a corresponding decrease in the output of the photosensors 4, 5. In other words, during the film advance, the film sensor output rises in a jump edge 1101 with a leading edge on the film leader side of the perforation and the film sensor output drops in a drop edge 1102 with the trailing edge on the film cartridge side of the perforation.

In this embodiment, the photosensors 4, 5 detect two edges relative to each film perforation. By counting these edges (the leading edge and the trailing edge) when the film is transported to a region 1103 where photography is possible (e.g., the film frame), one film frame advance is controlled. In other words in advancing one film frame, first the second photosensor 5 detects four edges. Then, when the first photosensor 4 detects four edges shown at position 1105 in FIG. 11(a), the controller 1 determines that one film frame has been advanced and controls the film transport motor control device to stop the film transport motor M.

On the other hand, if the film is transported to a region 1104 where photography is impossible (e.g., the portions of the film beyond the final frame B40), the photosensors 4, 5 do not detect a film perforation. Thus, if only two edges are detected by the second photosensor 5 and then by the first photosensor 4 shown at position 1106 in FIG. 11(a), then the controller 1, for example, determines that the film has been transported to the film end. Then, the film transport motor control device 3 stops the film transport motor M to terminate the film advance.

Figure 12A:
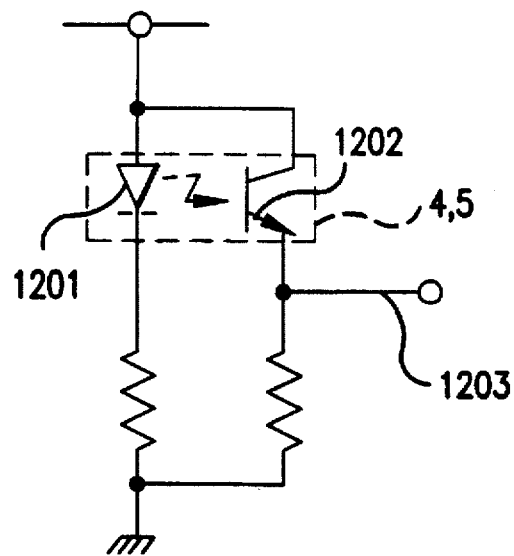
FIGS. 12(a)–12(b) are exemplary circuit diagrams of photosensors.

FIG. 12(a) shows an exemplary circuit for the photosensors 4, 5. The photosensors 4, 5 in FIG. 12(a) include a light source such as photodiode 1201 and a photodetector. Photodiode 1201 outputs light that is received by the photodetector such as phototransistor 1202. When the film is between the photodiode 1201 and the phototransistor 1202, the phototransistor turns OFF and an output 1203 of the circuit drops to a first (low) reference value, for example, zero or ground. Otherwise, the phototransistor 1202 receives light from the photodiode 1201 and turns ON to raise the output 1203 to a second (high, e.g., non-zero) reference value. Because of the different location of an output 1204 in FIG. 12(b), the output 1204 drops to the first (low) reference value when the phototransistor 1202 turns ON and rises to the second (high) reference value when the phototransistor 1202 turns OFF.

Using the photosensor circuit of FIG. 12(a), when there is no film in a photosensor position or when there is a perforation in the photosensor position, the amount of light received by photosensors 4, 5 increases. As a result, the photo-electric current increases and the output of the photosensor circuit increases. Conversely, when there is film in the photosensor position, the amount of light received by the photosensors 4, 5 is reduced. As a result, the photo-electric current is reduced and the output of the photosensor circuit is reduced.

The output wave shape of the photosensor circuit of FIGS. 11(a)-11(b) shows the output for the photosensor circuit shown in FIG. 12(a). As discussed above, when film perforations are in the photosensor position, there is an increase in the output at the jump edge 1101. When the perforation has passed the photosensor position, then the output decreases at the drop edge 1102. In other words, when the film advances, the photosensor output increases with the leading edge on the film leader side of the film perforation and the photosensor output drops with the trailing edge on the film cartridge side of the film perforation.

With the photosensor circuit of FIG. 12(a), if material having high reflectivity such as aluminum is arranged in the position of the photosensor, the amount of light received by the photosensors 4, 5 increases when no film or a perforation is in the photosensor position. As a result, the electric current and the output of the photosensor circuit increases. On the other hand, if film is in the photosensor position, the amount of light received by the photosensors 4, 5 is reduced. As a result, the photo-electric current and the photosensor circuit output are reduced.

Conversely, a material having lower reflectivity than the film can be placed in the position of the photosensor of the circuit of FIG. 12(a). In this case, no film or a perforation in the position of the photosensor would reduce the amount of light received. As a result, the photo-electric current and the photosensor circuit output would also be reduced. Further, when film is in the position of the photosensor in this case, the amount of received light, the photo-electric current, and the photosensor circuit output would increase.

Figure 12B:
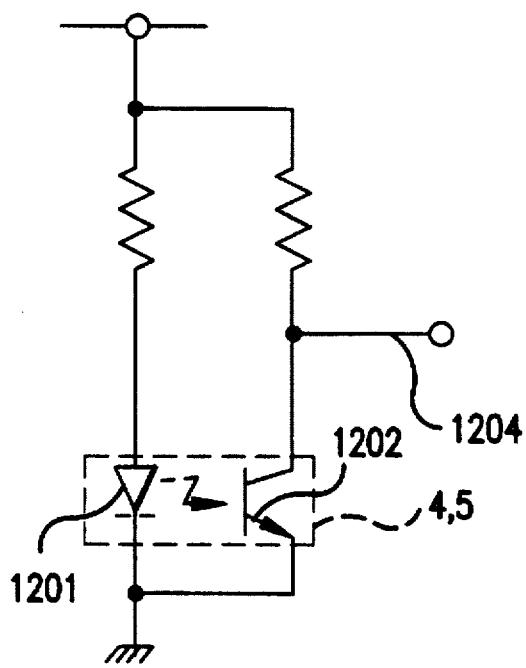

Alternatively, the photosensor circuit can be constructed as shown in FIG. 12(b) or the like. In FIG. 12(b), if a material having a high reflectivity (e.g., aluminum) is used and when there is no film in the photosensor position or when there is a perforation in the photosensor position, the amount of light received by photosensors 4, 5 increases. As a result, the output of the photosensor circuit is reduced. Conversely, when there is film in the photosensor position, the amount of light received by photosensors 4, 5 decreases. As a result, the output of the photosensor circuit is increased. In other words, with the circuit in FIG. 12(b), the high and low of the output of the circuit shown in FIG. 12(a) is reversed. Thus, the photosensor circuit output drops with the leading edge on the film leader side of each perforation, and the photosensor circuit output jumps with the trailing edge on the film cartridge side. Therefore, the output wave shape of the photosensor circuit shown in FIG. 12(b) would reverse the high and low of the output wave shape shown in FIGS. 11(a) and 11(b).

Conversely, a substance having a reflectivity ratio darker than the film can be placed in the position of the photosensor of the circuit of FIG. 12(b). In this case, no film or a perforation in the position of the photosensor reduces the amount of received light, reduces the photo electric-current, and increases the photosensor circuit output. Further, if film is in the position of the photosensor in this case, the amount of light received increases, and the photo-electric current increases and the photosensor circuit output decreases.

In summary, the photosensor circuit output can be variably controlled using combinations of the reflectivity of a material placed in the position of the photosensor and the constructions shown in FIGS. 12(a)-12(b).

FIG. 3 is a flow chart showing a sequence for detecting the film end according to the first embodiment using the photosensor circuit as shown in FIG. 12(a).

The controller 1 begins processing when a release switch (not shown) is closed through the operation of a release button (not shown). In step S1, a photography action is executed. After finishing the photography in step S1, in step S2, the film winding commences by the film transport motor M under the control of the film transport motor control device 3. In step S3, to accurately count the film perforations, an edge counter is initialized by being set to zero. In step S4, a determination is made whether a film perforation edge is detected by the second photosensor 5. The detection of the perforation can also include the performance of an A/D conversion of the second photosensor 5 output. The A/D conversion can compare the detected second photosensor 5 output with a threshold value recorded in the recording device 2. When the detected second photosensor 5 output data becomes greater than the threshold value, then a jump edge is detected in the output. Then, when the detected second photosensor 5 output data becomes smaller than the threshold value, a drop edge is detected in the output. Further, a comparator can also be used to compare the photosensor 4, 5 output and the threshold value. In this case, the output of the second photosensor 5 is input to the comparator along with a standard voltage corresponding to the threshold value received from the controller 1. In the comparator, a comparison is made between the photosensor output and the standard voltage (i.e., the threshold value) to determine the jump edge and the drop edge of the output from the photosensors 4, 5. The detection signal (e.g., the jump edge and the drop edge) of the film perforation using the comparison results or the like is input to the controller 1.

When the perforation edge is detected from the output of the second photosensor 5, then the controller 1 proceeds to step S5. In step S5, the edge counter is incremented. In step S6, a determination is made whether the count number of the edge counter is 4. As shown in FIGS. 11(a) and 11(b), when four perforation edges are detected from the second photosensor 5 output, two perforations have passed the position of the second photosensor 5 and the film is in a photography region.

When the edge counter is four in step S6, the controller 1 control continues to step S7. In step S7, the counter is set to zero. From step S7, the controller 1 control continues to step S8, where a determination is made whether a perforation edge has been detected from the first photosensor 4 output. If an edge is detected from the first photosensor 4 output, the controller 1 control continues to step S9 where the counter is incremented. From step S9, control continues to step S10 where a determination is made whether the count number of the edge counter is 4.

If four edges are detected by the first photosensor 4 after four perforation edges are detected by the second photosensor 5, the next photographic frame has been transported to the photographic position. If the edge counter is equal to 4 in step S10, the controller 1 control continues to step S11 where the edge counter is reset and then the film transport advance motor M is stopped in step S12. From step S12, the controller 1 control returns to step S1.

If an edge is not detected in step S8 or the edge counter does not equal 4 in step S10, the controller 1 controls returns to step S8. In step S8, the first photosensor 4 continues to be checked or is periodically checked to determine if an edge has been detected.

On the other hand, in step S6, when the number of edges detected by the second photosensor 5 is not four, then the controller 1 continues to step S13, where a determination is made whether an edge is detected from the first photosensor 4 output. If the number of detected edges by the second photosensor 5 is not four in step S6 and if an edge is not detected by the first photosensor 4 in step S13, then the controller 1 control returns to step S4 to check if the second photosensor 5 detects an edge of a film perforation.

However, if an edge is detected by the first photosensor 4 before the second photosensor 5 detects four edges, the controller 1 control continues to step S14. In step S14, a determination is made that the film has been advanced to the end and the controller 1 control continues to steps S15–S17. In step S15, the edge counter is reset and in step S16, the film advance motor M is stopped. Then, in step S17 the film transport motor control device 3 causes the film to be rewound into the cartridge by the film transport motor M. Since the process for rewinding film is well known to those of ordinary skill in the art, a detailed description is omitted. The film is rewound to be completely housed in the cartridge. Upon completing step S17, the controller ends the film end detection processing.

The first embodiment described above and as shown in FIGS. 11(a) and 11(b) uses two film perforations for each film frame. However, the number of perforations for each frame is not limited to two. When the number of perforations for each frame is a specified number, then the explanation of the process for detecting the film end of the first embodiment can be modified to detect the film end using the specified number of perforations.

Figure 4:
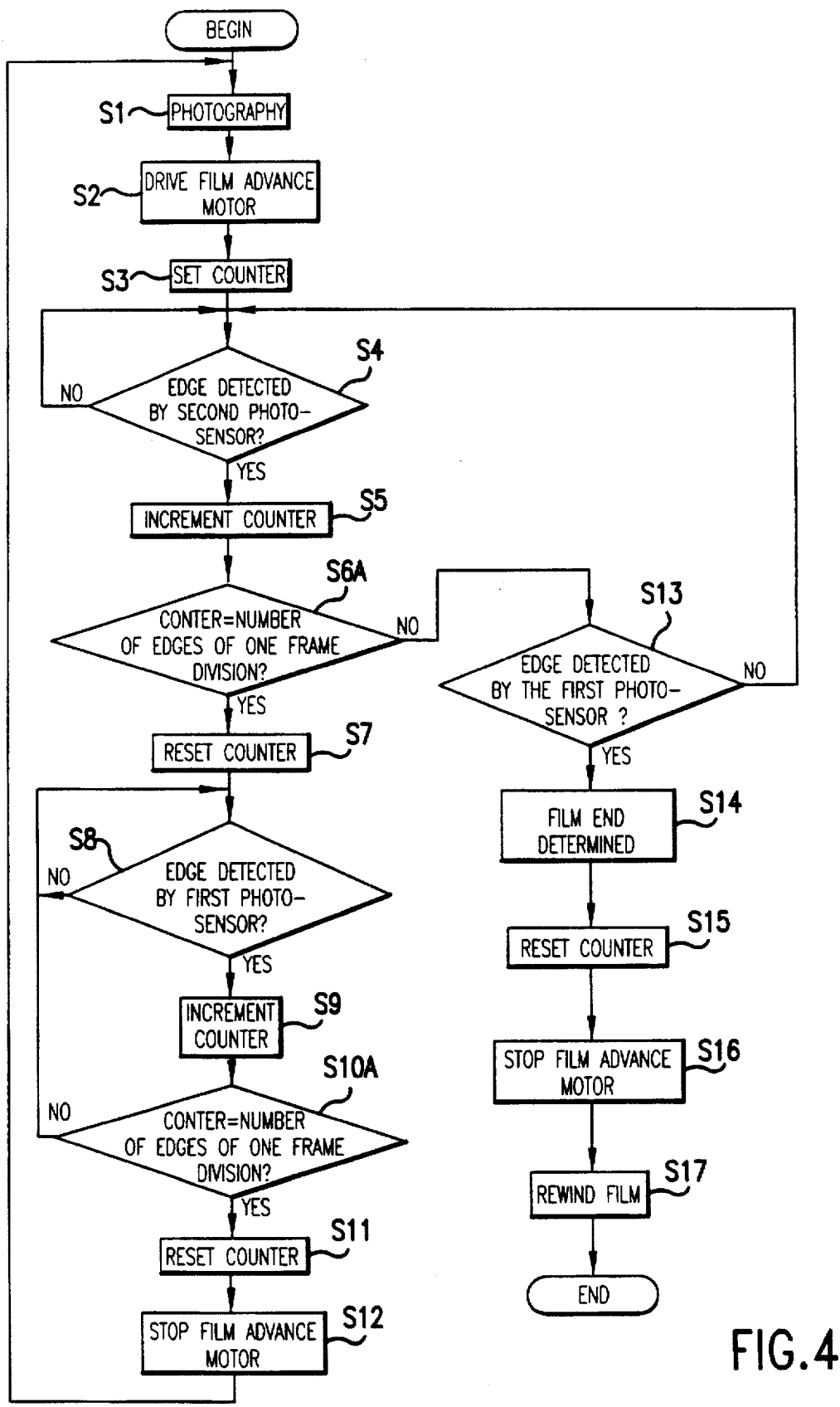
FIG. 4 is a flow chart showing a film transport sequence according to another embodiment of the present invention.

A film end detection process of just such an embodiment is shown in FIG. 4, which is a second embodiment of the invention. The same step numbers are applied to label steps performing the same processes described above for the first embodiment shown in FIG. 3. An explanation of the second embodiment focuses on the steps that differ. In addition, the second embodiment uses the photosensor circuit in FIG. 12(a).

In step S6A, a determination is made whether the number of edges detected by the second photosensor 5 corresponds to one film frame. For example, with film having three perforations formed for each frame, the number of edges of a frame division that corresponds to one frame is 6. If the appropriate number of edges is detected by the second photosensor in step S6A, then it is determined that the film is in the photography capable region. Then, the controller 1 controls the sequence of operations to perform steps S7–S12 to locate the next photographic frame in the photography position. Therefore, in step S10A, if the appropriate number of edges for one frame is detected by the first photosensor 4, then the determination is made that the next photographic frame has been advanced to the photography position. Therefore, the film advance is stopped in step S12.

On the other hand, if an edge is detected by the first photosensor 4 as shown in step S13 before the second photosensor 5 detects the number of edges of one frame division in step S6A, then the controller 1 controlled sequence of operations completes steps S14–S17. Thus, the determination is made that the film has been wound to its end in step S14. Then, the film is rewound in step S17 before the controller 1 terminates the completed film end detection process. The camera structure shown in FIG. 1 is the same for other specified numbers of perforations per frame. Thus, additional explanation are omitted.

The first and second embodiments described above use a joint edge counter relative to the first photosensor 4 and the second photosensor 5. However, individual edge counters can be used. In this case, two edges detected by the first photosensor 4 following two edges detected by the second photosensor 5 would appropriately be judged as the end of the film.

Figure 5:
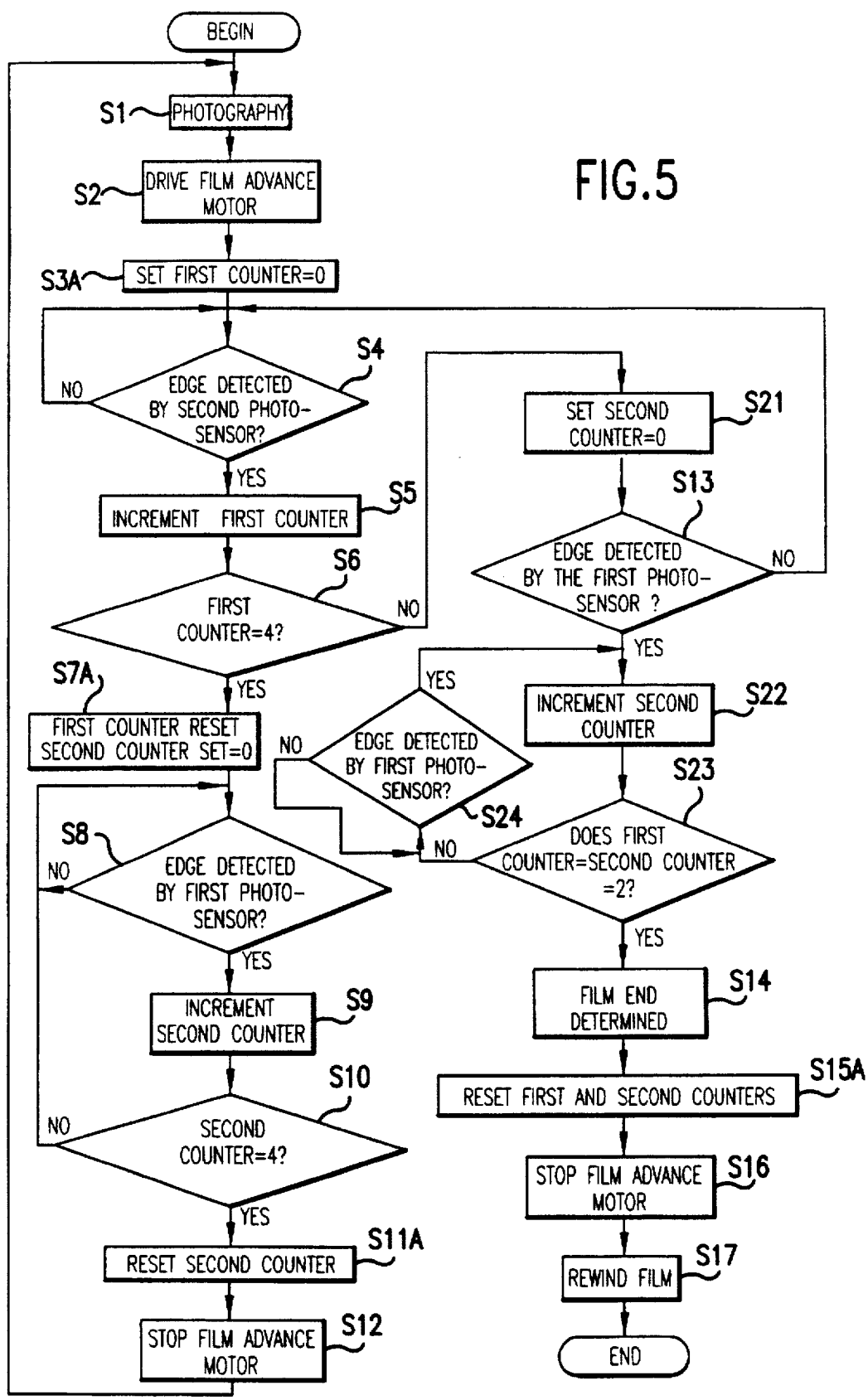
FIG. 5 is a flow chart showing a film transport sequence according to another embodiment of the present invention.

A third embodiment of film end processing according to the present invention is shown in FIG. 5. Again, the same step numbers are applied to the same processing steps shown in the first and second embodiments. The explanation of the third embodiment focuses on differences from the earlier embodiments. In addition, the third embodiment uses the photosensor circuit of FIG. 12(a).

A first counter is used with the second photosensor 5 and a second counter is used with the first photosensor 4. In steps S3A, S5, S7A, S9, S11A, S21, S22, and S15A, the first counter for the second photosensor 5 and the second counter for the first photosensor 4 are set, reset and incremented, respectively.

When four edges are not detected by the second photosensor 5 in step S6, then the first photosensor 4 is checked to determine whether it detects an edge in step S13. Then, the controller 1 control continues to steps S22–S24. In step S22, the second counter is incremented after each detection of an edge by the first photosensor 4. In step S23, the determination is made whether the film has been advanced to the region where photography is not possible. If two edges are detected by the second photosensor 5 in step S4, and two edges are detected by the first photosensor 4 in steps S13 and S24, the controller 1 control continues from step S23 to step S14. In other words, following the detection of two edges by the second photosensor 5, if two edges are detected by the first photosensor 4, the sequence of operations determines in step S14 that the film has reached the end and continues to step S15A where the first counter and the second counter are reset.

Figure 6:
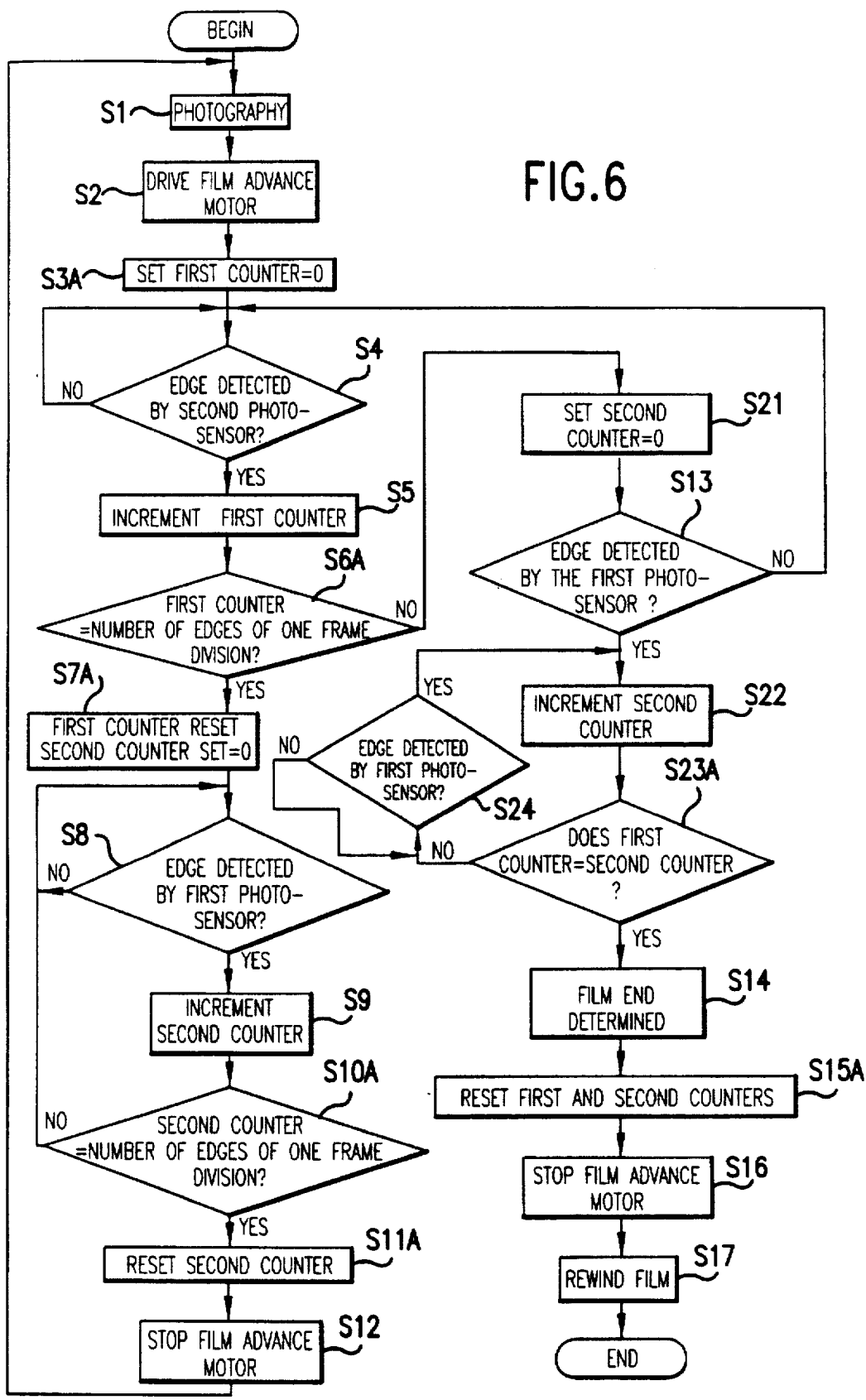
FIG. 6 is a flow chart showing a film transport sequence according to another embodiment of the present invention.

With reference to FIG. 6, a fourth embodiment is described having the number of perforations in each film frame being other than two. Further, the film end processing for the fourth embodiment uses separate edge counters for each of the photosensors 4, 5. Further, the same step numbers are applied to the same processing steps performing the same processes shown in the third embodiment as shown in FIG. 5. Thus, the fourth embodiment explanation focuses on differences from the earlier embodiments.

If the number of edges detected by the second photosensor 5 reaches one frame division in step S6A, then one frame advance processing is completed in steps S7A–S12 by setting the next photographic frame in the photographic position, as shown in FIG. 6.

On the other hand, if the number of edges detected by the second photosensor 5 has not reached one frame division in step S6A, then via steps S21 and S13 the first photosensor 4 is checked to determine if an edge is detected. In step S23A, if an edge is detected by the second photosensor 5, then confirmation is made whether the number of edges detected by the second photosensor 5 and the number of edges detected by the first photosensor 4 are equal. If the number of edges detected by the first photosensor 5 and the second photosensor 4 are equal, then the determination is that the film advance has reached the film end in step S14.

In the fourth embodiment described above, the film end determination is made based on the number of film perforation leading edges and the number of film perforation trailing edges detected by the photosensors 4, 5. However, film end discrimination according to the described embodiments can also be accomplished by detecting only the film perforation trailing edges or only the film perforation leading edges.

Figure 7:
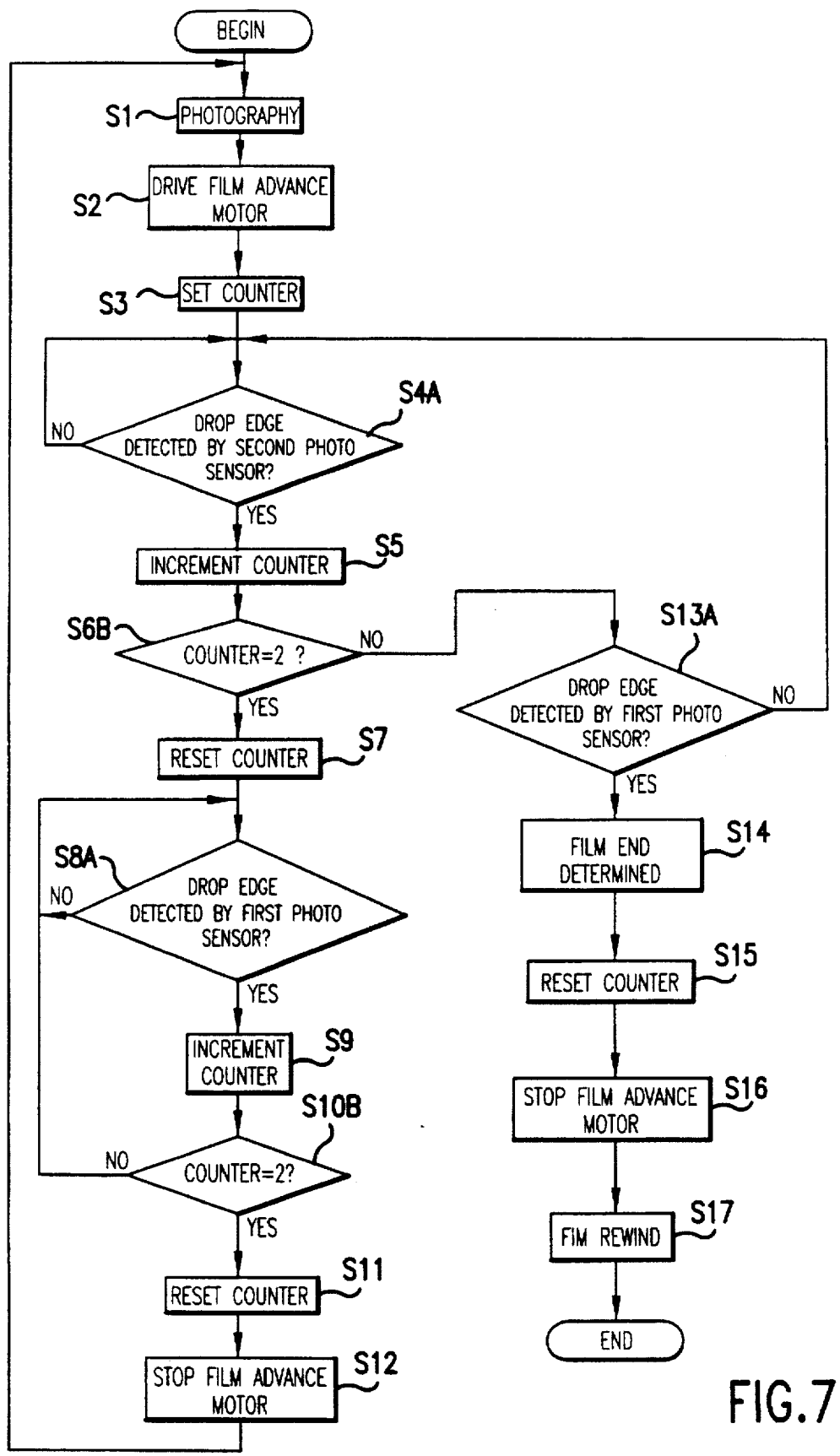
FIG. 7 is a flow chart showing a film transport sequence according to another embodiment of the present invention.

A fifth embodiment is described with reference to FIG. 7 where film perforation trailing edges are detected to perform film end detection processing. The same step numbers are applied to the steps performing the same processing as shown in earlier embodiments. The explanation of the fifth embodiment focuses on the differences from the previously described embodiments. In addition, the fifth embodiment uses the photosensor circuit shown in FIG. 12(a).

When the second photosensor 5 detects two trailing edges of film perforations in steps S4A–S6B, then the controller 1 control continues to step S7. Thus, the controller 1 has determined that the film being wound has reached a photography region of the film. In steps S7–S12, the controller 1 completes the one frame advance processing if the number of drop edges output by the first photosensor 4 to the controller 1 is two in step S10B.

On the other hand, if the number of drop edges output by the second photosensor 5 is not two in step S6B and a drop edge is output by the first photosensor 4 in step S13A, the controller 1 control continues to step S14 where the determination is made that the film has been wound to its end.

In the fifth embodiment, film end detection processing is made using film perforation trailing edge detection. However, film end detection could use the detection of a leading edge or a trailing edge of the film perforation.

Figure 8:
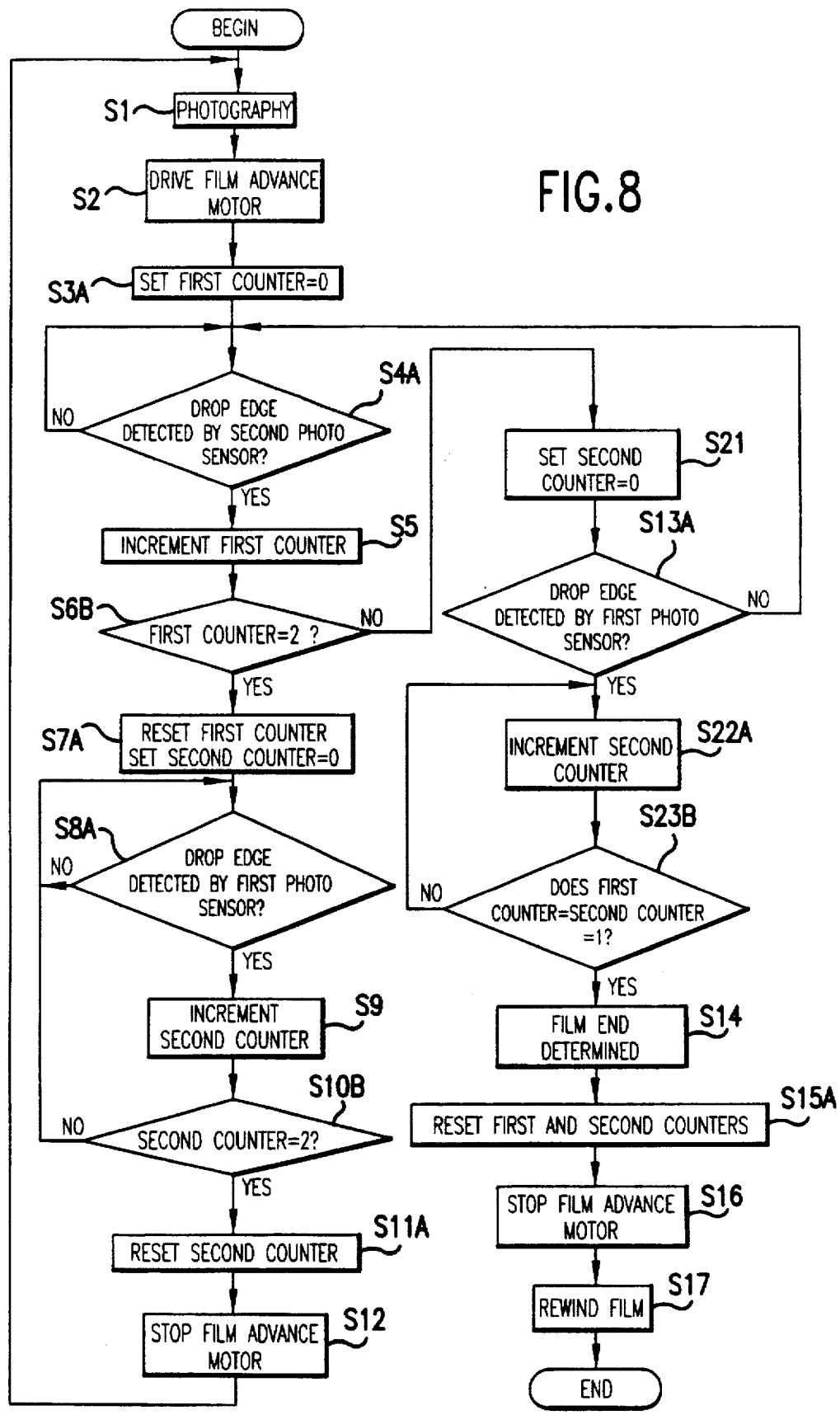
FIG. 8 is a flow chart showing a film transport sequence according to another embodiment of the present invention.

A sixth embodiment is described with reference to FIG. 8. The sixth embodiment uses separate edge counters for each of the photosensors 4 and 5. Further, the film end detection processing detects the trailing edges of the film perforations. Further, the same step numbers are applied to the steps performing the same processes described in the earlier embodiments. The explanation of the sixth embodiment focuses on differences from the earlier embodiments.

In the sixth embodiment, when the number of detected drop edges by the second photosensor 5 is not equal to two and a drop edge is detected by the first photosensor 4 via steps S6B, S21–S13A, the controller 1 control ultimately continues to step S14. In step S14, a determination is made that the film has been wound to its end. In step S13A of the sixth embodiment, determination of the film end was made based on detecting a trailing edge. However, determination of the film end can also be made based on detecting a leading edge.

Figure 9:
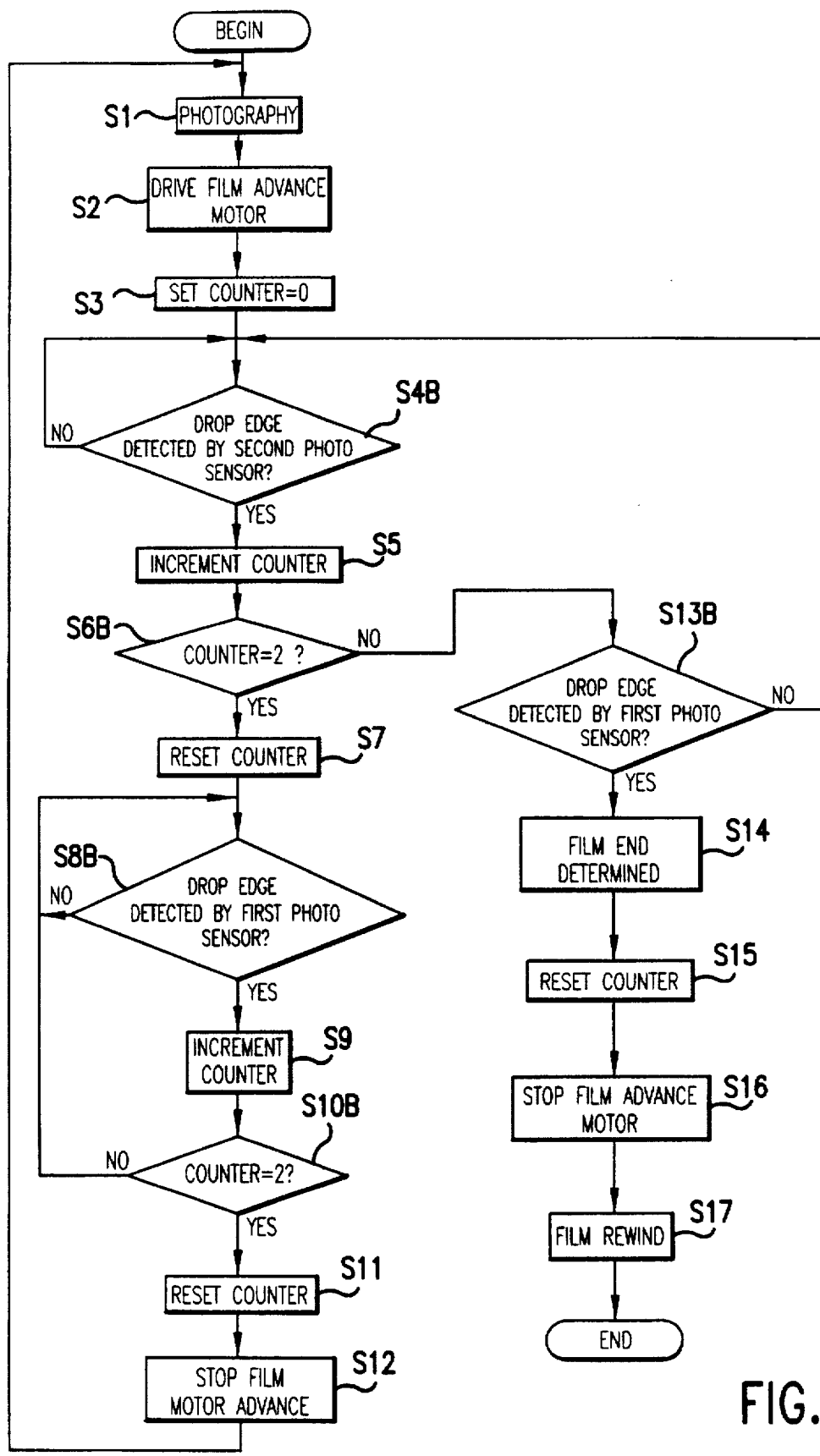
FIG. 9 is a flow chart showing a film transport sequence according to another embodiment of the present invention.

A seventh embodiment is described with reference to FIG. 9 where film end detection processing is made using the detected number of film perforation leading edges. The same step numbers are applied to steps performing the same processes as the sixth embodiment shown in FIG. 8. The seventh embodiment explanation focuses on differences from the sixth embodiment.

When the second photosensor 5 detects two leading edges of film perforations in steps S4B–S6B, then the controller 1 control continues to step S7. Thus, the controller 1 has determined that the film being wound has reached a photography region of the film. In steps S7–S12, the controller 1 completes the one frame advance processing if the number of jump edges output by the first photosensor 4 to the controller 1 is two in step S10B.

On the other hand, if the number of jump edges output by the second photosensor 5 is not two in step S6B and a jump edge is output by the first photosensor 4 in step S13B, the controller 1 control continues to step S14 where the determination is made that the film has been wound to its end.

In the seventh embodiment, film end detection processing is made using film perforation leading edge detection. However, film end detection could use the detection of a trailing edge or a leading edge of the film perforation.

Figure 10:
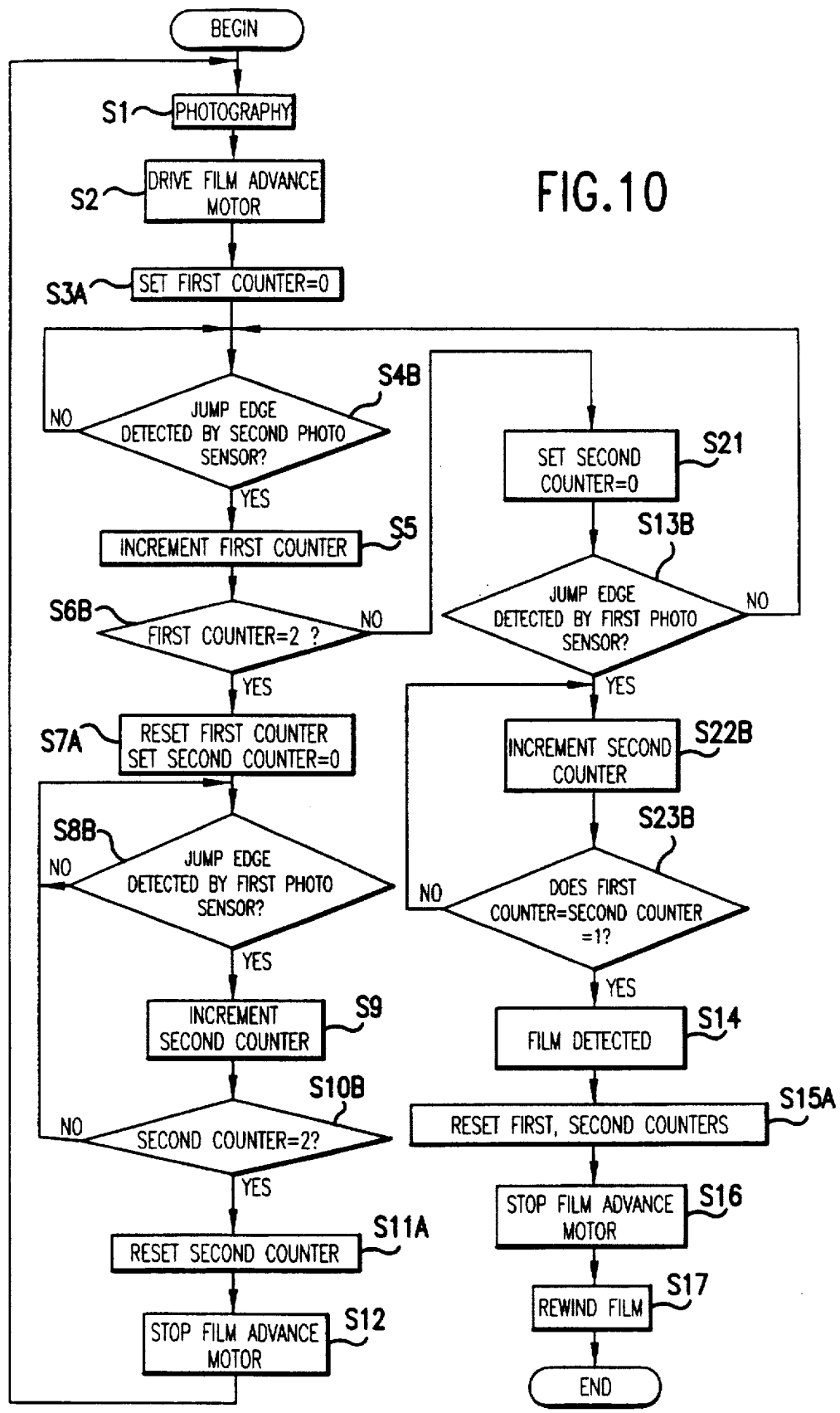
FIG. 10 is a flow chart showing a film transport sequence according to another embodiment of the present invention.

An eighth embodiment is described with reference to FIG. 10. The eighth embodiment uses edge counters provided for each of the photosensors 4 and 5 and the film end processing detects film perforation leading edges. Further, the same step numbers are applied to the steps performing the same processes described in the earlier embodiments. The explanation of the eighth embodiment focuses on differences from the earlier embodiments.

In the eighth embodiment, when the number of detected leading edges by the second photosensor 5 is not equal to two and a leading edge is detected by the first photosensor 4 via steps S6B, S21–S13B, the controller 1 control ultimately continues to step S14. In step S14, a determination is made that the film has been wound to its end. In step S13B of the eighth embodiment, determination of the film end was made based on detecting a leading edge. However, determination of the film end can also be made based on a trailing edge.

In the structure of the embodiments described above, the film transport motor control device 3 and the motor M function as a film advance device. Further, the first photosensor 4 with the controller 1 function as a first edge detection device and the second photosensor 5 with the controller 1 function as the second edge detection device. The controller 1 also functions as a film transport controller.

Further, although the above described embodiments of FIGS. 3, 5, 7 and 9 used film having two perforations formed per frame, as shown in FIGS. 2(a)–2(b), the number of perforations per frame and the film perforation arrangement relative to each film frame is not intended to be limited to two perforations per frame or the illustrative location in FIGS. 2(a)–2(b) on the film frame.

In addition, detection of the film perforation edges was performed using the photosensors and the controller. However, edge detection can be performed using various combinations of a photosensor, a comparator, and a controller. In addition, edge detection can be performed by other methods.

Thus, according to the embodiments described above, if before a second edge detection device detects a specified number of perforation edges, a first edge detection device detects a specified number of perforation edges, then the film has been wound to its end and the film advance is stopped. Therefore, even if there is a change in the electric power source voltage or in the load of the film transport mechanism, e.g., because of a temperature change, the film end can be accurately detected and the film transport reliability is improved.

Alternatively, the first edge detection device and the second edge detection device can detect a trailing edge or a leading edge of the film perforations to determine that the film has been wound to its end. Further, the film transport control can use the actual edge detection signal or an output signal transmitted by the detection device. In addition, the film transport control can use a comparison between a reference signal and the detection signal or the output signal to determine whether the film end is reached.

Therefore, if prior to the second edge detection device detecting the leading edge or the trailing edge of the film perforations, the first edge detection device detects a specified number (for example, two) of leading edges or trailing edges of the film perforations, then a determination can be made that the film has been wound to its end.

Alternatively, before the detection of the specified number of perforations by the second edge detection device, the first edge detection device detects a number of edges corresponding to the number of detected edges by the second edge detection device, then a determination can be made that the film has wound to its end.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A film transport device that feeds film through a camera, the film having perforations therein that are located relative to frames of the film, said film transport device comprising:

a film advance device that feeds film through the camera;

a first perforation detector and a second perforation detector arranged in a film path of the film so as to detect the perforations in the film, the first perforation detector being spaced from the second perforation detector in a direction of film advancement; and a film transport controller that counts a first count of the perforations detected by the first perforation detector, counts a second count of the perforations detected by the second perforation detector and controls the film advance device so that the film advance device stops feeding film when an end of the film is reached, said film transport controller determining that the end of the film is reached when the first count becomes one before the second count equals a predetermined number.

2. The device of claim 1, wherein the film has two perforations formed relative to each frame of film, said predetermined number of being two.

3. The device of claim 1, wherein the film transport controller determines that the end of the film is reached when the first count of perforations detected by the first perforation detector is equal to the second count of perforations detected by the second perforation detector.

4. The device of claim 1, wherein the first perforation detector is a first edge detector that detects edges of the perforations, the second perforation detector is a second edge detector that detects edges of the perforations, and the film transport controller counts a first edge count and a second edge count of the edges of the perforations detected by the first and second edge detectors, respectively, the film transport controller determines that the end of the film is reached when the first edge count becomes one before the second edge count reaches a predetermined number.

5. The device of claim 4, wherein the film has two perforations formed relative to each frame of film, each of the perforations including a leading edge on a leader side of the film and a trailing edge on a film cartridge side of the film, said predetermined number of edges being four.

6. The device of claim 4, wherein the film transport controller determines that the end of the film has been reached when the first edge count counts at least one of a leading edge and a trailing edge of a film perforation prior to the predetermined number being reached by the second edge count.

7. The device of claim 4, wherein the film transport controller determines that the end of the film has been reached when the first edge count counts one of a leading edge and a trailing edge of a perforation before the second edge count counts the predetermined number of leading edges of perforations.

8. The device of claim 4, wherein the film transport controller determines that the end of the film has been reached when the first edge count counts one of a leading edge and a trailing edge of a perforation before the second edge count reaches the predetermined number of trailing edges of perforations.

9. The device of claim 6, wherein the film has two perforations formed relative to each frame of film, and the predetermined number of edges is two.

10. The device of claim 7, wherein the film has two perforations formed relative to each frame of film, and the predetermined number of edges is two.

11. The device of claim 8, wherein the film has two perforations formed relative to each frame of film, and the predetermined number of edges is two.

12. The device of claim 4, wherein the film transport controller determines that the end of the film has been reached when a positive number of the first edge count is equal to the second edge count.

13. The device of claim 1, wherein the first perforation detector includes a first photosensor and the second perforation detector includes a second photosensor.

14. The device of claim 13, wherein the first photosensor and the second photosensor are first and second photointerrupters, respectively.

15. The device of claim 13, wherein the first photosensor and the second photosensor are first and second photoreflectors, respectively.

16. The device of claim 1, wherein the film transport controller includes a microcomputer.

17. A film transport device that feeds film through a camera, the film having perforations therein that are located relative to frames of the film, said film transport device comprising:

film feeding means for feeding the film through the camera;

first perforation detection means arranged in a film path of the film so as to detect the perforations in the film;

second perforation detection means arranged in the film path of the film so as to detect the perforations in the film;

the first perforation detection means being spaced from the second perforation detection means in a direction of film advancement; and control means for counting a first count of the perforations detected by the first perforation detection means and counting a second count of the perforations detected by the second perforation detection means, the control means for further determining that the end of the film is reached when the first count becomes one before the second count equals a predetermined number.

18. The device of claim 17, wherein the film has two perforations formed relative to each frame of film, said predetermined number of being two.

19. The device of claim 17, wherein the control means determines that the end of the film is reached when the first count of perforations detected by the first perforation detection means is equal to the second count of perforations detected by the second perforation detection means.

20. The device of claim 17, wherein the first perforation detection means is a first edge detection means that detects edges of the perforations, the second perforation detection means is a second edge detection means that detects edges of the perforations, and the control means counts a first edge count and a second edge count of the edges of the perforations detected by the first and second edge detection means, respectively, the control means determines that the end of the film is reached when the first edge count becomes one before the second edge count reaches a predetermined number of.

21. The device of claim 20, wherein the film has two perforations formed relative to each frame of film, each of the perforations including a leading edge on a leader side of the film and a trailing edge on a film cartridge side of the film, said predetermined number of edges being four.

22. The device of claim 20, wherein the control means determines that the end of the film has been reached when the first edge count counts at least one of a leading edge and a trailing edge of a film perforation prior to the predetermined number being counted by the second edge count.

23. The device of claim 20, wherein the control means determines that the end of the film has been reached when the first edge count counts one of a leading edge and a trailing edge of a perforation before the second edge count reaches the predetermined number of leading edges of perforations.

24. The device of claim 22, wherein the film has two perforations formed relative to each frame of film, and the predetermined number of edges is two.

25. The device of claim 20, wherein the control means determines that the end of the film has been reached when the first edge count is equal to the second edge count, wherein the first edge count is a positive number.

26. A method of feeding film through a camera, the film having perforations therein that are located relative to frames of the film, said method comprising the steps of:

counting the perforations in the film during advancement of the film through the camera with a first perforation detector to get a first perforation count;

counting the perforations in the film during the advancement of the film through the camera with a second perforation detector to get a second perforation count, the first perforation detector being spaced from the second perforation detector in a direction of the film advancement; and determining that the end of the film is reached when the first perforation count becomes one before a predetermined number is reached by the second perforation count.

27. The method of claim 26, further comprising the step of stopping the advancement of the film through the camera when it is determined that the end of the film is reached.

28. The method of claim 26, wherein the film has two perforations formed relative to each frame of film, said predetermined number of being two.

29. The method of claim 26, wherein the determining step includes determining that the end of the film is reached when the first perforation count is positive and equal to the second perforation count.

30. The method of claim 26, wherein the counting steps count edges of the perforations to get first and second edge counts, respectively, and the determining step includes determining that the end of the film is reached when the first edge count becomes one before a predetermined number is reached by the second edge count.

* * * * *